United States Patent
Manov et al.

(10) Patent No.: US 10,270,672 B2
(45) Date of Patent: Apr. 23, 2019

(54) COLLECTING INFORMATION FOR TRACING IN A COMPLEX COMPUTING SYSTEM

(71) Applicant: SAP SE, Walldorf (DE)

(72) Inventors: Milen Manov, Sofia (BG); Vasil Panushev, Sofia (BG)

(73) Assignee: SAP SE, Walldorf (DE)

( * ) Notice: Subject to any disclaimer, the term of this patent is extended or adjusted under 35 U.S.C. 154(b) by 305 days.

(21) Appl. No.: 15/372,823

(22) Filed: Dec. 8, 2016

(65) Prior Publication Data

US 2018/0167293 A1    Jun. 14, 2018

(51) Int. Cl.
| | |
|---|---|
| *G06F 11/00* | (2006.01) |
| *G06F 15/16* | (2006.01) |
| *H04L 12/26* | (2006.01) |
| *H04L 29/08* | (2006.01) |
| *G06F 11/36* | (2006.01) |
| *G06F 11/07* | (2006.01) |

(52) U.S. Cl.
CPC ............ *H04L 43/06* (2013.01); *G06F 11/079* (2013.01); *G06F 11/36* (2013.01); *G06F 11/362* (2013.01); *H04L 43/04* (2013.01); *H04L 43/0823* (2013.01); *H04L 67/02* (2013.01); *H04L 67/10* (2013.01)

(58) Field of Classification Search
CPC . H04L 41/06; H04L 41/0631; H04L 41/0659; H04L 41/069–41/0695; G06F 11/0766–11/079; G06F 11/30; G06F 11/36; G06F 11/3656; G06F 11/362; G06F 11/3636; G06F 11/3668
See application file for complete search history.

(56) References Cited

U.S. PATENT DOCUMENTS

| | | | | |
|---|---|---|---|---|
| 5,740,354 | A * | 4/1998 | Ben-Natan | G06F 11/0718 714/45 |
| 7,975,262 | B2 * | 7/2011 | Cozmei | G06F 11/3688 717/128 |
| 8,850,260 | B1 * | 9/2014 | Fuller | G06F 11/0727 714/3 |
| 8,893,091 | B2 * | 11/2014 | Goel | G06F 11/3636 702/186 |
| 9,275,369 | B2 * | 3/2016 | Salas | G06F 9/4843 |
| 9,386,007 | B2 | 7/2016 | Minov et al. | |
| 2016/0098314 | A1 * | 4/2016 | Talafa | G05B 23/0213 714/37 |
| 2017/0277618 | A1 * | 9/2017 | Sankruthi | G06F 11/366 |

* cited by examiner

*Primary Examiner* — Brendan Y Higa
(74) *Attorney, Agent, or Firm* — Fish & Richardson P.C.

(57) ABSTRACT

A first request is received at a central tracing component and from a first module in a complex computing system. The first request is received when the first module is called to execute. In response to the first request, input data of the first module is stored in the central tracing component. A second request is received from the first module when the first module has been successfully executed. In response to the second request, output data of the first module is stored in the central tracing component. A third request is received from a second module when the second module has failed execution. In response to the third request, the stored data in the central tracing component is sent to the second module.

20 Claims, 3 Drawing Sheets

COLLECTING INFORMATION FOR TRACING IN A COMPLEX COMPUTING SYSTEM

BACKGROUND

A complex computing system that includes a number of software modules can be implemented in a cloud computing environment. Users can send service requests to the cloud environment to use the services provided by the complex system, where during the processing of a service request, different modules in the complex system can be called to perform operations. When errors occur during the processing of service requests, debug traces can be activated in the complex system to generate logs for error analysis. However, in some cases, the complex system is used productively and processes a large number of service requests in parallel. The high processing load on the complex system can make debugging impossible because activating debug traces would generate a huge amount of logs even within the short time frame when the error occurs. Further, in some cases, configurations (for example, debugging configurations or settings) are maintained by different tenants/customers using the complex system or the cloud environment and accessing the configurations requires the involvement of the tenants/customers.

SUMMARY

The present disclosure describes methods and systems, including computer-implemented methods, computer program products, and computer systems for collecting information for tracing in a complex computing system.

In an implementation, a first request is received at a central tracing component and from a first module in a complex computing system. The first request is received when the first module is called to execute. In response to the first request, input data of the first module is stored in the central tracing component. A second request is received from the first module when the first module has been successfully executed. In response to the second request, output data of the first module is stored in the central tracing component. A third request is received from a second module when the second module has failed execution. In response to the third request, the stored data in the central tracing component is sent to the second module.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described approach provides a centralized point to which different modules in a complex computing system can report context in which the modules execute operations during the processing of a service request to the complex system. In other words, the described approach provides an effective trace of modules that are called during the processing of the service request along with all the information that the modules received and produced. Second, when errors occur during the processing of a service request, the described approach enables modules (for example, the module in which an error occurred) to report the error along with the context in which the error occurred. The error context information enables efficient error analysis. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
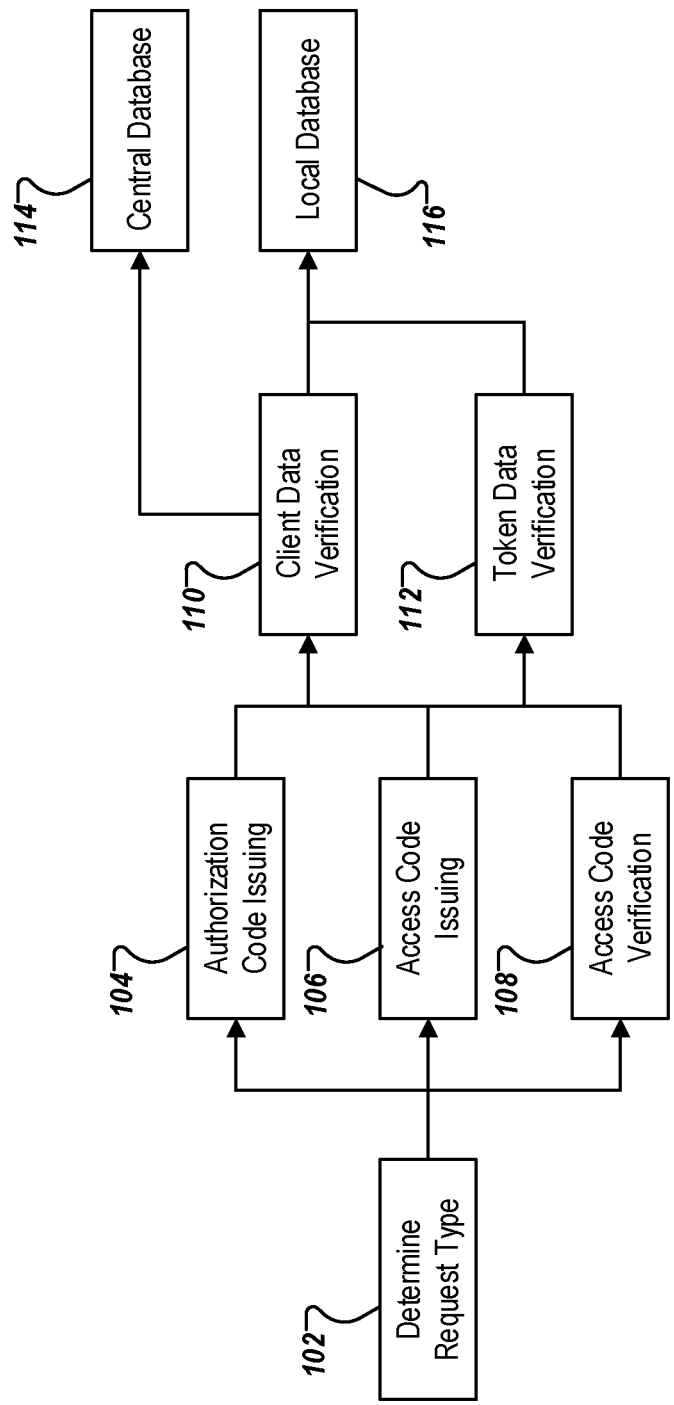
FIG. 1 is a block diagram illustrating an example complex computing system, according to an implementation.

The following detailed description describes collecting information for tracing in a complex computing system and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

A complex computing system that includes a number of software modules can be implemented in a cloud computing environment. Users can send service requests to the cloud environment to use the services provided by the complex system. During the processing of a service request, different modules in the complex system can be called to perform operations. When errors occur during the processing of service requests, debug traces can be activated in the complex system to generate logs for error analysis. However, in some cases, the complex system is used productively and processes a large number of service requests in parallel. The high processing load on the complex system can make debugging impossible because activating debug traces would generate a huge amount of logs even within the short time frame when the error occurs. Further, in some cases, configurations (for example, debugging configurations or settings) are maintained by different tenants/customers using the complex system or the cloud environment and accessing the configurations requires the involvement of the tenants/customers.

At a high-level, the described approach provides a central tracing component that is accessible to different modules in the complex system. During the processing of a service request, each module that the service request traverses can report its context in which the module executes operations (such as status, input data and output data of the module). In other words, the central tracing component can record an effective trace of modules that are called during the processing of the service request along with all the information that the modules received and produced. When an error occurs, the module where the error occurs can access the central tracing component and provide all available context data associated with the service request to an error log entry to facilitate error analysis.

In a typical implementation, for each received service request, the complex system creates a thread to process the service request. The central tracing component can include a thread-local variable that acts as a global variable within the scope of a thread. The central tracing component can create an instance of the thread-local variable for each thread. The thread-local variable is initialized when a thread is created for a service request, and is cleared when the request is serviced. During the processing of the service request, different modules in the complex system are called to execute operations. When a module is called, the module reports its input parameters to the central tracing component, for example, by storing the input parameters in the thread-local variable. When a module finishes its operation successfully, the module reports the output data to the central tracing component, for example, by storing the output data in the thread-local variable. In some implementations, when the input data or output data is being stored, the central tracing component can seamlessly add information of the reporting module and information of the service request currently being processed to the thread-local variable as a context, for example, name of the reporting module, time of reporting, or server specific context. The server specific context can be application name, account name, subscription name, user name, or name of the processing thread. Context data of different modules are stored in order in the thread-local variable as the service request traverses the modules.

When a module fails to perform its operation, the module can access the central tracing component and retrieve the context data of the current service request and the context data of the modules that the current service request has traversed. For example, the module can retrieve all the data available in the thread-local variable along with all relevant information (exceptions, timestamps etc.) and send to an error log. The described approach allows different modules to report input or output data in a central place that is accessible in the context of the current service request and also to make all the information that the modules reported available so that it can be traced as "context information" of the error log entry. In case of the processing thread spawning another thread, the central tracing component ensures that the spawned thread receives all the data recorded by the parent, that is, the two threads share a common storage.

FIG. 1 is a block diagram illustrating an example complex computing system 100, according to an implementation. The complex system 100 includes different modules of an OAuth server providing authorization services, each module performing a separated role. The complex system 100 includes modules of determining request type 102, authorization code issuing 104, access code issuing 106, access code verification 108, client data verification 110, token data verification 112, central database 114, and local database 116. These modules can be called when the complex system 100 processes a service request. During the processing of the service request, each module receives the data that it needs in order to perform its role. For example, the token data verification module 112 only needs the token and the client identifier to perform its role. However, when an error occurs in the token data verification module 112 it would be useful for a developer to have access to all the information associated with the service request to facilitate error analysis. For example, if an error occurs in the token data verification module 112, the module 112 would be able to trace only the access token and the client identifier. However, other context data associated with the service request, such as the account and the application with which the service request is associated, is also relevant for the error analysis. The described approach enables the token data verification module 112 to provide not only the access token and the client identifier but also other context data associated with the service request to an error log.

Following is an example JAVA implementation of an entry point servlet that includes a central tracing component. The entry point servlet can be part of the complex system, providing application programming interfaces (APIs) for using and accessing the central tracing component. The entry point servlet can be called by a user agent, for example, a browser. The central tracing component is implemented as a ThreadLocal variable that is initialized when the entry point servlet is called. The ThreadLocal variable can have different instances for threads associated with different service requests. Since each service request is processed in a single thread, all the modules called during the processing of the request will have access to the central tracing component and will be able to use the APIs.

In one implementation, a possible configuration of software code to perform portions of the above-described functionality can resemble:

```
10  public class EntrypointServlet extends HttpServlet {
11
12    private static final Logger logger = LoggerFactory.getLogger(EntrypointServlet.class);
13
14    private static final long serialVersionUID = 1L;
15    private static final ThreadLocal<LogReporting> reportingLocal = new
        ThreadLocal<LogReporting>( ) {
16      @Override
17      protected LogReporting initial Value( ) {
18        return new LogReporting( );
19      }
20    };
21
22    public static LogReporting getLogReporting( ) {
23      return reportingLocal.get( );
24    }
25
26    @Override
27    protected void doGet(HttpServletRequest req, HttpServletResponse resp) throws
        ServletException, IOException {
```

```
28    LogReporting reporting = getLogReporting( );
29    try {
30      // call the appropriate modules here as the requirements
31      reportSuccess(reporting);
32    } finally {
33      reportingLocal.remove( );
34    }
35  }
36
37
38  private void reportSuccess(LogReporting reporting) {
39    logger.debug("Events during request processing: [{ }]", reporting.getEvents( ));
40  }
41
42  private void reportFailure(LogReporting reporting) {
43    logger.error("Failed to process request: [{ }]", reporting.getEvents( ));;
44  }
45 }
46
47 class LogReporting {
48
49   private List<Event> events = new ArrayList<Event>( );
50
51   public void reportEvent(String module, String message) {
52     reportEvent(module, message, null);
53   }
54
55   public void reportEvent(String module, String message, Throwable error) {
56     Event e = new Event( );
57     e.timeStamp = System.currentTimeMillis( );
58     e.module = module;
59     e.message = message;
60     e.error = error;
61     getEvents( ).add(e);
62   }
63
64   public List<Event> getEvents( ) {
65     return events;
66   }
67 }
68 class Event {
69   long timeStamp;
70   String module;
71   String message;
72   Throwable error;
73 }.
```

In the above example implementation, the static ThreadLocal variable provides instances of the LogReporting class specific for every thread. The static method getLogReporting can be called from other modules in the complex system to get access to the thread specific LogReporting instance. The ThreadLocal variable is cleared at the end of the thread due to the usage of thread pools. The modules that are called during the service request processing are provided access to the central tracing component via a public static method of the entry point class that also holds the ThreadLocal variable.

Figure 2:
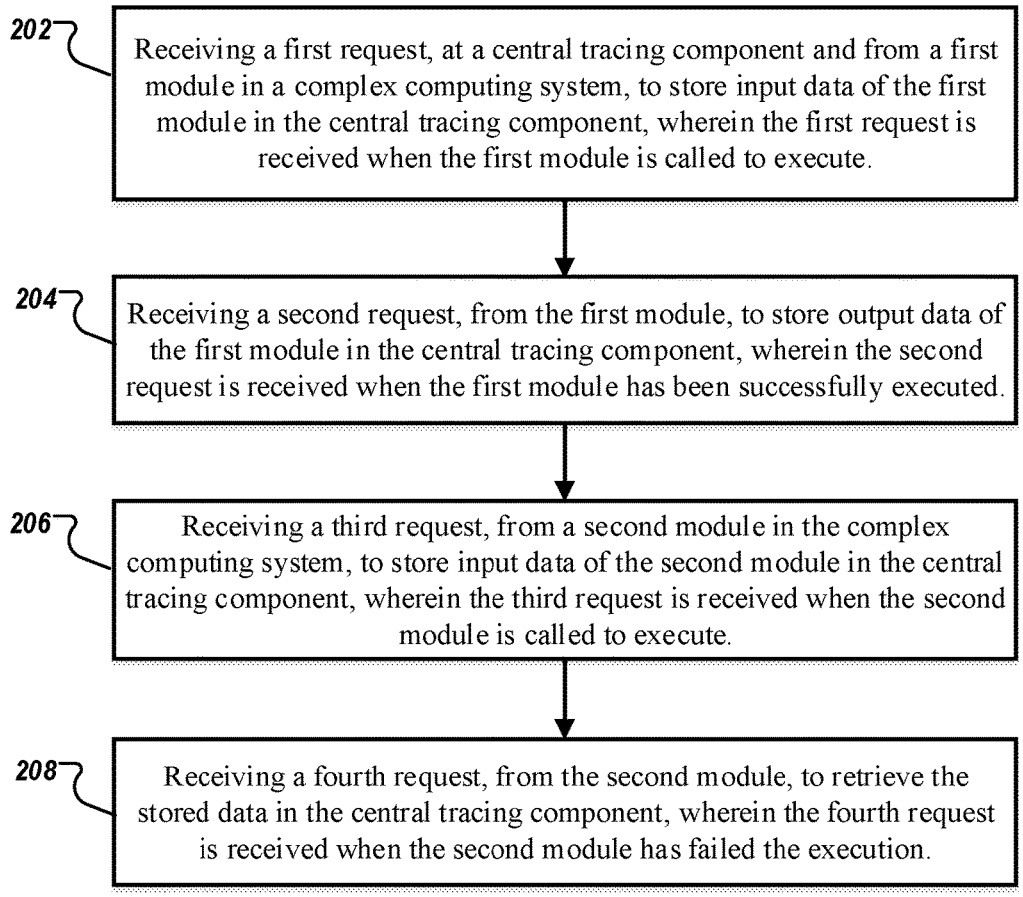
FIG. 2 is a flowchart illustrating an example method for collecting information for tracing in a complex computing system, according to an implementation.

FIG. 2 is a flowchart illustrating an example method 200 for collecting information for tracing in a complex computing system, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, when a first module in a complex computing system is called to execute operations, the first module sends a first request to a central tracing component to store input data of the first module in the central tracing component. The first request can include the input data to be stored. In response to receiving the first request, the central tracing component stores the input data of the first module. For example, the central tracing component can store a string including the input data of the first module. The central tracing component can also record metadata associated with the processing thread and the reporting module, for example, time of data storing, name of the recording module (that is, the first module), and server specific context variables. The server specific context variables can include application name, account name, subscription name, user name, or name of the processing thread. In other words, the central tracing component can automatically record the metadata so that the first module provides only the input data to be recorded and does not need to provide the metadata. From 202, method 200 proceeds to 204.

At 204, when the first module is successfully executed, the first module sends a second request to the central tracing component to store output data of the first module in the central tracing component. The second request can include the output data to be stored. In response to receiving the second request, the central tracing component stores the output data of the first module, for example, a string including the output data of the first module. Similar to 202, the central tracing component can also automatically store metadata associated with the processing thread and the reporting module (that is, the first module). From 204, method 200 proceeds to 206.

At 206, when a second module in the complex computing system is called to execute operations, the second module sends a third request to the central tracing component to store input data of the second module in the central tracing component. The third request can include the input data to be stored. In response to receiving the third request, the central tracing component stores the input data of the second module, for example, a string including the input data of the second module. Similar to 202, the central tracing component can also store metadata associated with the processing thread and the reporting module (that is, the second module). From 206, method 200 proceeds to 208.

At 208, when the second module fails the execution, the second module sends a fourth request to the central tracing component to retrieve the stored data in the central tracing component. In response to the fourth request, the central tracing component sends the stored data to the second module. The second module can send the retrieved data to an error log so that efficient error analysis can be performed due to the context information collected by the central tracing component. From 208, method 200 stops.

Figure 3:
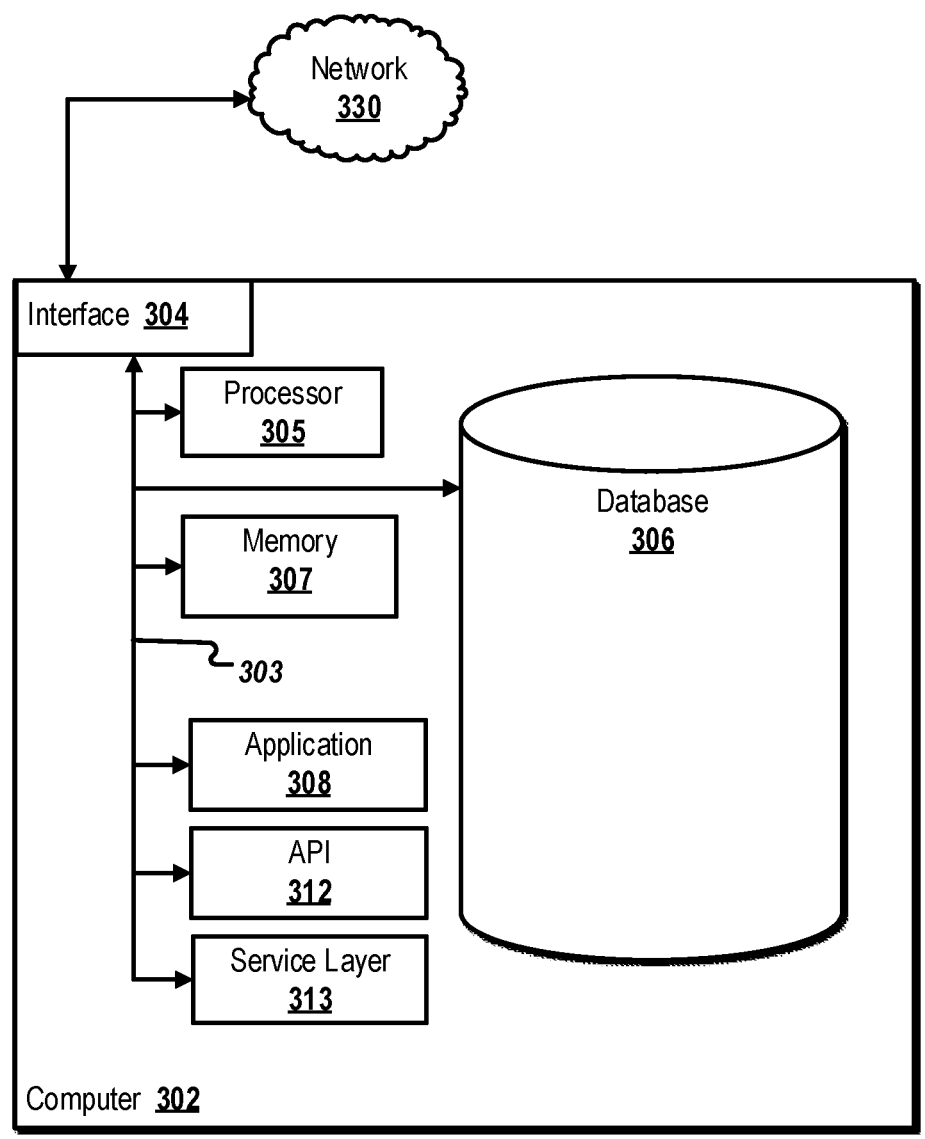
FIG. 3 is a block diagram illustrating an exemplary computer system used to provide computational functionalities associated with described algorithms, methods, functions, processes, flows, and procedures as described in the instant disclosure, according to an implementation.
Figure 3:

FIG. 3 is a block diagram of an exemplary computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an API 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302.

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, applications, etc. Further, although illustrated as a single application 308, the application 308 may be implemented as multiple applications on the computer 302. In addition, although illustrated as integral to the computer 302, in alternative implementations, the application 308 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented method includes: receiving a first request at a central tracing component and from a first module in a complex computing system, wherein the first request is received when the first module is called to execute; in response to the first request, storing input data of the first module in the central tracing component; receiving a second request from the first module, wherein the second request is received when the first module has been successfully executed; in response to the second request, storing output data of the first module in the central tracing component; receiving a third request from a second module in the complex computing system, wherein the third request is received when the second module has failed execution; and in response to the third request, sending the stored data in the central tracing component to the second module.

The foregoing and other described implementations can each optionally include one or more of the following features:

A first feature, combinable with any of the following features, where the method further includes: receiving a fourth request from the second module, wherein the fourth request is received when the second module is called to execute; and in response to the fourth request, storing input data of the second module in the central tracing component.

A second feature, combinable with any of the previous or following features, where the central tracing component is a variable, the variable is a thread-local variable having a scope within a thread, each thread corresponds to processing of a service request to the complex computing system, and each thread is associated with an instance of the variable.

A third feature, combinable with any of the previous or following features, where the method further includes in response to the first request, storing in the central tracing component: a string including the input data of the first module, and at least one or more context information of: name of reporting module, time of data storing, or server specific context information including one or more of application name, account name, subscription name, user name, or name of processing thread.

A fourth feature, combinable with any of the previous or following features, where the variable is initialized when the thread is created and is cleared when the thread is finished.

A fifth feature, combinable with any of the previous or following features, where the central tracing component is in a JAVA servlet.

A sixth feature, combinable with any of the previous or following features, where the complex computing system is in a cloud computing environment.

A seventh feature, combinable with any of the previous or following features, where the second module retrieves the data stored in the central tracing component and sends the retrieved data to an error log.

In a second implementation, a non-transitory, computer-readable medium storing one or more instructions executable by a computer system to perform operations comprising: receiving a first request at a central tracing component and from a first module in a complex computing system, wherein the first request is received when the first module is called to execute; in response to the first request, storing input data of the first module in the central tracing component; receiving a second request from the first module, wherein the second request is received when the first module has been successfully executed; in response to the second request, storing output data of the first module in the central tracing component; receiving a third request from a second module in the complex computing system, wherein the third request is received when the second module has failed execution; and in response to the third request, sending the stored data in the central tracing component to the second module.

The foregoing and other described implementations can each optionally include one or more of the following features:

A first feature, combinable with any of the following features, where the central tracing component is a variable, the variable is a thread-local variable having a scope within a thread, each thread corresponds to processing of a service request to the complex computing system, and each thread is associated with an instance of the variable.

A second feature, combinable with any of the previous or following features, comprising one or more instructions to, in response to the first request, store in the central tracing component: a string including the input data of the first module, and at least one or more context information of: name of reporting module, time of data storing, or server specific context information including one or more of application name, account name, subscription name, user name, or name of processing thread.

A third feature, combinable with any of the previous or following features, where the variable is initialized when the thread is created and is cleared when the thread is finished.

A fourth feature, combinable with any of the previous or following features, where the central tracing component is in a JAVA servlet.

A fifth feature, combinable with any of the previous or following features, where the complex computing system is in a cloud computing environment.

A sixth feature, combinable with any of the previous or following features, where the second module retrieves the data stored in the central tracing component and sends the retrieved data to an error log.

In a third implementation, a computer-implemented system includes a computer memory, and a hardware processor interoperably coupled with the computer memory and configured to perform operations including: receiving a first request at a central tracing component and from a first module in a complex computing system, wherein the first request is received when the first module is called to execute; in response to the first request, storing input data of the first module in the central tracing component; receiving a second request from the first module, wherein the second request is received when the first module has been successfully executed; in response to the second request, storing output data of the first module in the central tracing component; receiving a third request from a second module in the complex computing system, wherein the third request is received when the second module has failed execution; and in response to the third request, sending the stored data in the central tracing component to the second module.

The foregoing and other described implementations can each optionally include one or more of the following features:

A first feature, combinable with any of the following features, where the central tracing component is a variable, the variable is a thread-local variable having a scope within a thread, each thread corresponds to processing of a service request to the complex computing system, and each thread is associated with an instance of the variable.

A second feature, combinable with any of the previous or following features, further configured to, in response to the first request, store in the central tracing component: a string including the input data of the first module, and at least one or more context information of: name of reporting module, time of data storing, or server specific context information including one or more of application name, account name, subscription name, user name, or name of processing thread.

A third feature, combinable with any of the previous or following features, where the variable is initialized when the thread is created and is cleared when the thread is finished.

A fourth feature, combinable with any of the previous or following features, where the second module retrieves the data stored in the central tracing component and sends the retrieved data to an error log.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a first request at a central tracing component and from a first module in a complex computing system, wherein the first request is received when the first module is called to execute;
   in response to the first request, storing input data of the first module in the central tracing component;
   receiving a second request from the first module, wherein the second request is received when the first module has been successfully executed;
   in response to the second request, storing output data of the first module in the central tracing component;
   receiving a third request from a second module in the complex computing system, wherein the third request is received when the second module has failed execution; and
   in response to the third request, sending the stored data in the central tracing component to the second module.

2. The computer-implemented method of claim 1, further comprising:
   receiving a fourth request from the second module, wherein the fourth request is received when the second module is called to execute; and
   in response to the fourth request, storing input data of the second module in the central tracing component.

3. The computer-implemented method of claim 1, wherein the central tracing component is a variable, the variable is a thread-local variable having a scope within a thread, each thread corresponds to processing of a service request to the complex computing system, and each thread is associated with an instance of the variable.

4. The computer-implemented method of claim 3, further comprising in response to the first request, storing in the central tracing component:
   a string including the input data of the first module, and
   at least one or more context information of:
      name of reporting module,
      time of data storing, or
      server specific context information including one or more of application name, account name, subscription name, user name, or name of processing thread.

5. The computer-implemented method of claim 3, wherein the variable is initialized when the thread is created and is cleared when the thread is finished.

6. The computer-implemented method of claim 1, wherein the central tracing component is in a JAVA servlet.

7. The computer-implemented method of claim 1, wherein the complex computing system is in a cloud computing environment.

8. The computer-implemented method of claim 1, wherein the second module retrieves the data stored in the central tracing component and sends the retrieved data to an error log.

9. A non-transitory, computer-readable medium storing one or more instructions executable by a computer system to perform operations comprising:
   receiving a first request at a central tracing component and from a first module in a complex computing system, wherein the first request is received when the first module is called to execute;
   in response to the first request, storing input data of the first module in the central tracing component;
   receiving a second request from the first module, wherein the second request is received when the first module has been successfully executed;
   in response to the second request, storing output data of the first module in the central tracing component;
   receiving a third request from a second module in the complex computing system, wherein the third request is received when the second module has failed execution; and
   in response to the third request, sending the stored data in the central tracing component to the second module.

10. The non-transitory, computer-readable medium of claim 9, wherein the central tracing component is a variable, the variable is a thread-local variable having a scope within a thread, each thread corresponds to processing of a service request to the complex computing system, and each thread is associated with an instance of the variable.

11. The non-transitory, computer-readable medium of claim 10, comprising one or more instructions to, in response to the first request, store in the central tracing component:
a string including the input data of the first module, and at least one or more context information of:
name of reporting module,
time of data storing, or
server specific context information including one or more of application name, account name, subscription name, user name, or name of processing thread.

12. The non-transitory, computer-readable medium of claim 10, wherein the variable is initialized when the thread is created and is cleared when the thread is finished.

13. The non-transitory, computer-readable medium of claim 9, wherein the central tracing component is in a JAVA servlet.

14. The non-transitory, computer-readable medium of claim 9, wherein the complex computing system is in a cloud computing environment.

15. The non-transitory, computer-readable medium of claim 9, wherein the second module retrieves the data stored in the central tracing component and sends the retrieved data to an error log.

16. A computer-implemented system, comprising:
a computer memory; and
a hardware processor interoperably coupled with the computer memory and configured to perform operations comprising:
receiving a first request at a central tracing component and from a first module in a complex computing system, wherein the first request is received when the first module is called to execute;
in response to the first request, storing input data of the first module in the central tracing component;
receiving a second request from the first module, wherein the second request is received when the first module has been successfully executed;
in response to the second request, storing output data of the first module in the central tracing component;
receiving a third request from a second module in the complex computing system, wherein the third request is received when the second module has failed execution; and
in response to the third request, sending the stored data in the central tracing component to the second module.

17. The computer-implemented system of claim 16, wherein the central tracing component is a variable, the variable is a thread-local variable having a scope within a thread, each thread corresponds to processing of a service request to the complex computing system, and each thread is associated with an instance of the variable.

18. The computer-implemented system of claim 17, wherein the hardware processor is further configured to, in response to the first request, store in the central tracing component:
a string including the input data of the first module, and at least one or more context information of:
name of reporting module,
time of data storing, or
server specific context information including one or more of application name, account name, subscription name, user name, or name of processing thread.

19. The computer-implemented system of claim 17, wherein the variable is initialized when the thread is created and is cleared when the thread is finished.

20. The computer-implemented system of claim 16, wherein the second module retrieves the data stored in the central tracing component and sends the retrieved data to an error log.

* * * * *